US010122704B2

(12) United States Patent
Xiu (10) Patent No.: US 10,122,704 B2
(45) Date of Patent: Nov. 6, 2018

(54) PORTAL AUTHENTICATION

(71) Applicant: Alibaba Group Holding Limited, Grand Cayman (KY)

(72) Inventor: Chao Xiu, Shanghai (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 14/686,115

(22) Filed: Apr. 14, 2015

(65) Prior Publication Data

US 2015/0295915 A1    Oct. 15, 2015

(30) Foreign Application Priority Data

Apr. 14, 2014 (CN) .......................... 2014 1 0148906

(51) Int. Cl.
*H04L 29/06* (2006.01)
*H04L 29/08* (2006.01)
(Continued)

(52) U.S. Cl.
CPC .......... *H04L 63/083* (2013.01); *G06F 21/313* (2013.01); *H04L 63/0876* (2013.01);
(Continued)

(58) Field of Classification Search
CPC ... H04L 63/08; H04L 63/083; H04L 63/0876; H04L 63/0853; H04W 12/06
(Continued)

(56) References Cited

U.S. PATENT DOCUMENTS

2008/0320560 A1* 12/2008 Casey ..................... H04L 63/10
726/3
2010/0223654 A1    9/2010 Kwan et al.
(Continued)

FOREIGN PATENT DOCUMENTS

CN      103079201 A     5/2013
CN      103401884 A    11/2013
(Continued)

OTHER PUBLICATIONS

PCT Search Report and Written Opinion dated Jul. 24, 2015 for PCT application No. PCT/US15/25712, 8 pages.
(Continued)

*Primary Examiner* — William S Powers
(74) *Attorney, Agent, or Firm* — Lee & Hayes, PLLC (57) ABSTRACT

When a portable terminal of a user receives an authentication prompt message pushed by an application server, an authentication prompt option corresponding to the authentication prompt message is output at the portable terminal. A portal authentication is initiated after the authentication prompt option is selected by the user. MAC address information of the portable terminal returned by a portal server is acquired after the portal authentication is initiated. A user name and password for the application client terminal to log into the application server terminal is used as a user name and password for portal authentication. The MAC address information of the portable terminal returned by the portal server is sent to the application server. The present disclosure facilitates the operation of using the portal authentication, prevents the user from forgetting to perform the portal authentication, and brings convenience to those who are not familiar with the portal authentication mechanism.

20 Claims, 6 Drawing Sheets

(51) Int. Cl.
*G06F 21/31* (2013.01)
*H04W 12/06* (2009.01)
*H04L 29/12* (2006.01)

(52) U.S. Cl.
CPC .......... *H04L 67/26* (2013.01); *H04L 67/2814* (2013.01); *H04W 12/06* (2013.01); *G06F 2221/2103* (2013.01); *G06F 2221/2117* (2013.01); *H04L 61/6022* (2013.01)

(58) Field of Classification Search
USPC ......................................................... 726/7
See application file for complete search history.

(56) References Cited

U.S. PATENT DOCUMENTS

| | | |
|---|---|---|
| 2010/0316213 A1 | 12/2010 | Goel |
| 2011/0265173 A1 | 10/2011 | Naaman et al. |
| 2012/0030737 A1 | 2/2012 | Pagan et al. |
| 2013/0023241 A1 | 1/2013 | Lim |
| 2013/0061297 A1 | 3/2013 | Larsen et al. |
| 2013/0139221 A1 | 5/2013 | Gundavelli et al. |
| 2013/0163583 A1 | 6/2013 | Meghani et al. |
| 2013/0283050 A1 | 10/2013 | Gupta et al. |
| 2013/0340046 A1 | 12/2013 | Yu et al. |
| 2013/0347073 A1 | 12/2013 | Bryksa et al. |
| 2014/0157376 A1 | 6/2014 | Nambiar et al. |
| 2014/0189808 A1* | 7/2014 | Mahaffey .............. H04L 63/083 726/4 |
| 2014/0196119 A1 | 7/2014 | Hill et al. |
| 2014/0237572 A1* | 8/2014 | Zheng ................... H04W 12/06 726/7 |
| 2014/0359740 A1 | 12/2014 | Yoon et al. |
| 2014/0369335 A1 | 12/2014 | Mansour |

FOREIGN PATENT DOCUMENTS

| | | |
|---|---|---|
| CN | 103596177 A | 2/2014 |
| JP | 2007293868 | 11/2007 |
| WO | WO2013039278 | 3/2013 |

OTHER PUBLICATIONS

Extended European Search Report dated Sep. 26, 2017 for European Patent Application No. 5780018.6, 9 pages.
Chinese Office Action & Search Report for Chinese Patent Application No. CN201410148906.8, dated Sep. 29, 2017, a counterpart foreign application of U.S. Appl. No. 14/686,115, 18 pages.

* cited by examiner

PORTAL AUTHENTICATION

CROSS-REFERENCE TO RELATED PATENT APPLICATION

This application claims foreign priority to Chinese Patent Application No. 201410148906.8 filed on 14 Apr. 2014, entitled "Application Client Terminal, Server, and Corresponding Portal Verification Method," which is hereby incorporated by reference in its entirety.

TECHNICAL FIELD

The present disclosure relates to the field of Internet technology, and in particular, to an application client terminal and an application server.

BACKGROUND

With the development of upstream and downstream industries of the mobile Internet, at present mobile access has gradually become main stream for obtaining access to the Internet. Users use portable terminals such as smart phones and pads to utilize various mobile applications including online shopping applications and social applications. Even at home, a lot of users still prefer to use portable terminals to access a network. At a public place, a user may use mobile data access technologies such as 3G/4G to access the Internet. When a free wireless network access service is available at a public place where the user is located, the user usually chooses to access the Internet via Wireless Local Area Network (WLAN). Compared with mobile data access, the WLAN access generally provides a more stable and faster Internet access experience, and significantly reduces Internet access fees for the user.

Public places such as a Haidilao™ restaurant or Starbucks™ generally provide wireless access service for users. As a merchant, Haidilao™ or Starbucks™ needs to construct and manage its own wireless network, such as deploying a wireless network that includes a wireless access point (AP) and a wireless access controller (AC). In this scenario, the merchant such as Haidilao™ is not only an owner of the wireless network but also an administrator of the wireless network, and needs to take security and service quality of the wireless access service into consideration.

From the perspective of security, user identity authentication is undoubtedly an extremely important security mechanism. Wireless authentication modes such as Wi-Fi Protected Access (WPA)/WPA2 are widely applied to small-sized networks such as a home network, and an administrator of the network informs each authorized user of a secret key in a relatively safe manner. In some medium-sized or large-sized networks deployed by merchants, informing users of a key one by one is obviously unacceptable. Moreover, the mechanism described above runs at a wireless link layer, and therefore has poor compatibility. For example, portable terminals of some users are earlier models, and the wireless technology used on such portable terminals may not support authentication modes such as WPA2.

A portal authentication runs at a layer above the network layer, has general applicability, and is almost irrelevant to hardware of portable terminals of the user and wireless access technologies used on the portable terminals. A user obtains network access permission on the basis of a standard portal authentication process as long as the user accesses a wireless network. However, the portal authentication technology actually originates from the era of personal computer (PC) Internet, and has a technical problem for adapting to the usage characteristics of the mobile Internet.

Figure 1:
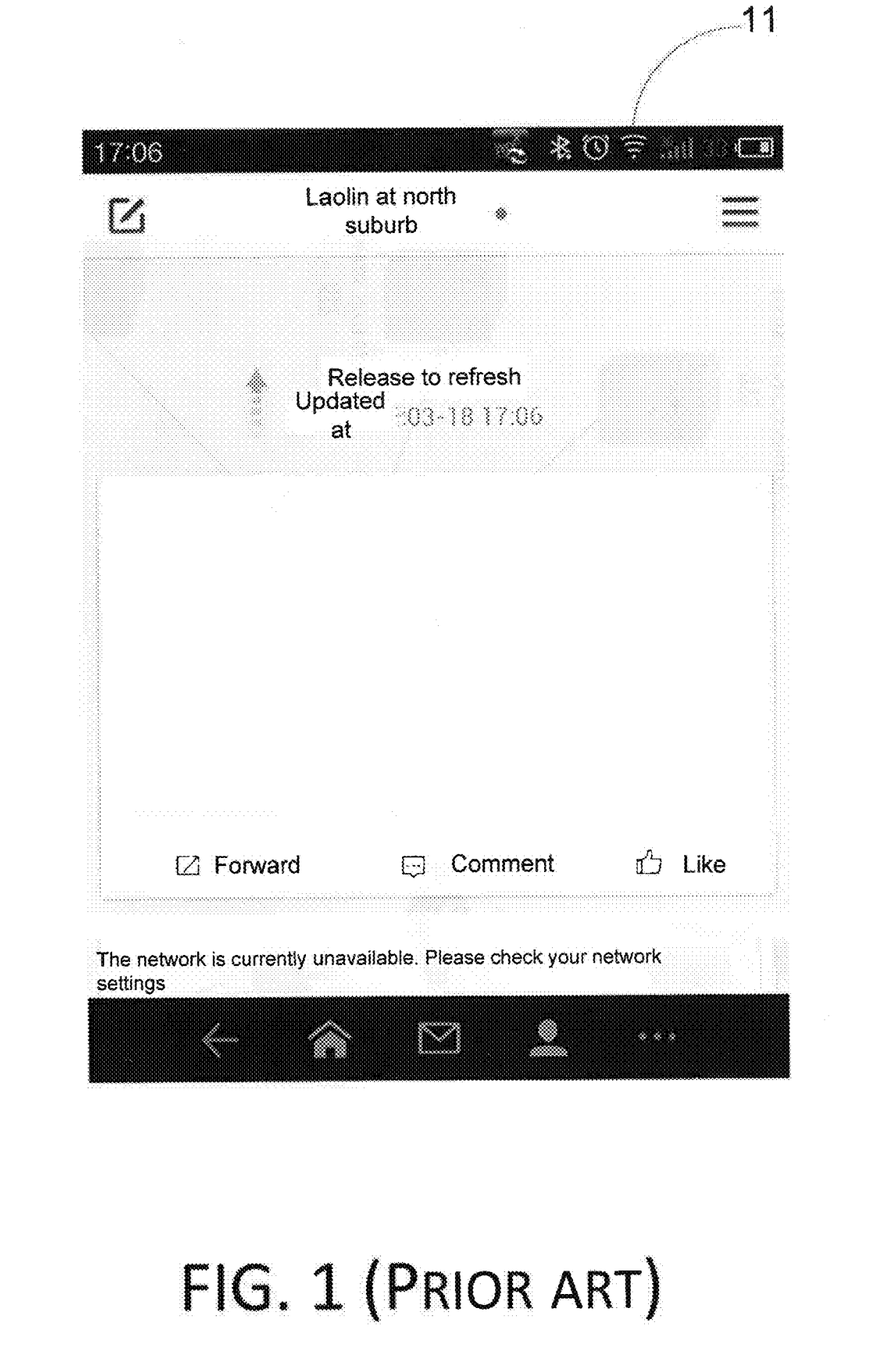
FIG. 1 is a schematic diagram of a Weibo™ refreshing result when a user forgets to perform a portal authentication.

Referring to FIG. 1, a WLAN Internet access service provided by China Unicom™ is used as an example. After a smart phone of a user successfully connects to an AP of China Unicom™ (accesses a wireless network), on the message prompt bar on top of a screen of the smart phone of the user, a wireless network connection icon 11 indicates that the smart phone has successfully connected to the wireless network. However, at this time, the user may not refresh Weibo™ successfully. The root cause of this problem is that many ordinary users take it for granted that they may access an external network (generally the Internet) after successfully connecting to the wireless network. But in fact, the users merely successfully connect to the wireless network of Unicom™ in a wireless manner. Except for some authentication-free sites (such as a Dynamic Host Configuration Protocol (DHCP) server), the users cannot access the Internet before passing a portal authentication.

With regard to a user terminal, the portal authentication is implemented on the basis of a browser, and many ordinary users do not know that they need to open the browser to initiate a portal authentication process because this authentication mechanism is different from the authentication mode of wireless networks in a user's homes. From another perspective, even if some users understand working principles of the portal authentication, it is still inconvenient to perform the portal authentication. For example, portable terminals of users generally have a function of automatically connecting to wireless networks to which the portable terminals have previously connected, while many smart phones will automatically turn off mobile data connections such as 3G when the smart phones successfully connect to the wireless network. Once the smart phone of the user automatically connects to the wireless network while the user does not notice this situation, the user will not initiate a portal authentication through the browser. In such a scenario, the user terminal may not access the Internet because the mobile data connection is turned off and problems will occur in many applications that need exchange data online all the time.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to apparatus(s), system(s), method(s) and/or computer-readable instructions as permitted by the context above and throughout the present disclosure.

The present disclosure provides an example application client terminal that resides or is applied on a portable terminal. The client includes a push processing unit, a portal agent unit, and a media access control address (MAC) synchronization unit.

The push processing unit, when receiving an authentication prompt message pushed by an application server, outputs an authentication prompt option corresponding to the authentication prompt message in a message prompt bar of the portable terminal.

The portal agent unit initiates a portal authentication after it is determined that the authentication prompt option is selected by a user, acquires MAC address information of the present portable terminal returned by a portal server after the portal authentication is initiated. The portal agent, during the portal authentication, uses a user name and password that the application client terminal logs into the application server or the application server terminal as a user name and password for the portal authentication.

The MAC synchronization sends the MAC address information of the present portable terminal returned by the portal server to the application server.

The present disclosure further provides an example portal authentication method applied to a portable terminal. The method includes the following operations.

Step A: when an authentication prompt message pushed by an application server is received, an authentication prompt option corresponding to the authentication prompt message is output in a message prompt bar of the portable terminal;

Step B: the portal authentication is initiated after it is determined that the authentication prompt option is selected by a user. The MAC address information of the present portable terminal returned by a portal server is acquired after the portal authentication is initiated. During the portal authentication, a user name and password for the application logging into an application server is used as a user name and password for the portal authentication.

Step C: the MAC address information of the present portable terminal returned by the portal server is sent to the application server.

The present disclosure further provides an example application server terminal applied to a server or that resides at the server and interacts with an application client terminal and a wireless server. The wireless server manages wireless access devices in at least one wireless network. The application server terminal includes a push management unit and a MAC maintenance unit.

When a terminal connection message sent by the wireless server is received, the push management unit acquires MAC address information of a portable terminal carried in the message, searches for a user corresponding to the MAC address in a local user MAC table, and pushes an authentication prompt message to an application client terminal of the user if the corresponding user is found.

When a portal authentication request is received, the portal authentication unit determines if a user name and password in the request belong to a registered user of the present application, and if so, determines that portal authentication of the user succeeds.

When the MAC address information sent by the application client terminal of the user is received, the MAC maintenance unit updates the user MAC table with a correspondence relationship between the MAC address information and the user.

The present disclosure further provides an example portal authentication service method applied to an application server to interact with a portable terminal and a wireless server. The wireless server manages wireless access devices in at least one wireless network. The method may include the following operations.

Step a: when a terminal connection message sent by the wireless server is received, the MAC address information of a portable terminal carried in the message is acquired, a user corresponding to the MAC address is searched in a local user MAC table, and an authentication prompt message is pushed to the user if the corresponding user is found;

Step b: when a portal authentication request is received, it is determined if the user name and password in the request belong to a registered user of the present application, and if so, it is determined that portal authentication of the user succeeds.

Step c: when the MAC address information sent by the user is received, the user MAC table is updated with a correspondence relationship between the MAC address information and the user.

Compared with the conventional techniques, the present disclosure significantly facilitates the user's operation of using a portal authentication, and prevents, to a large degree, a problem that a user fails to access the Internet through a wireless network as the user forgets to perform a portal authentication or does not know the portal authentication mechanism to access the Internet. The present disclosure adapts better to the user requirements in a mobile Internet environment.

DETAILED DESCRIPTION

Figure 2:
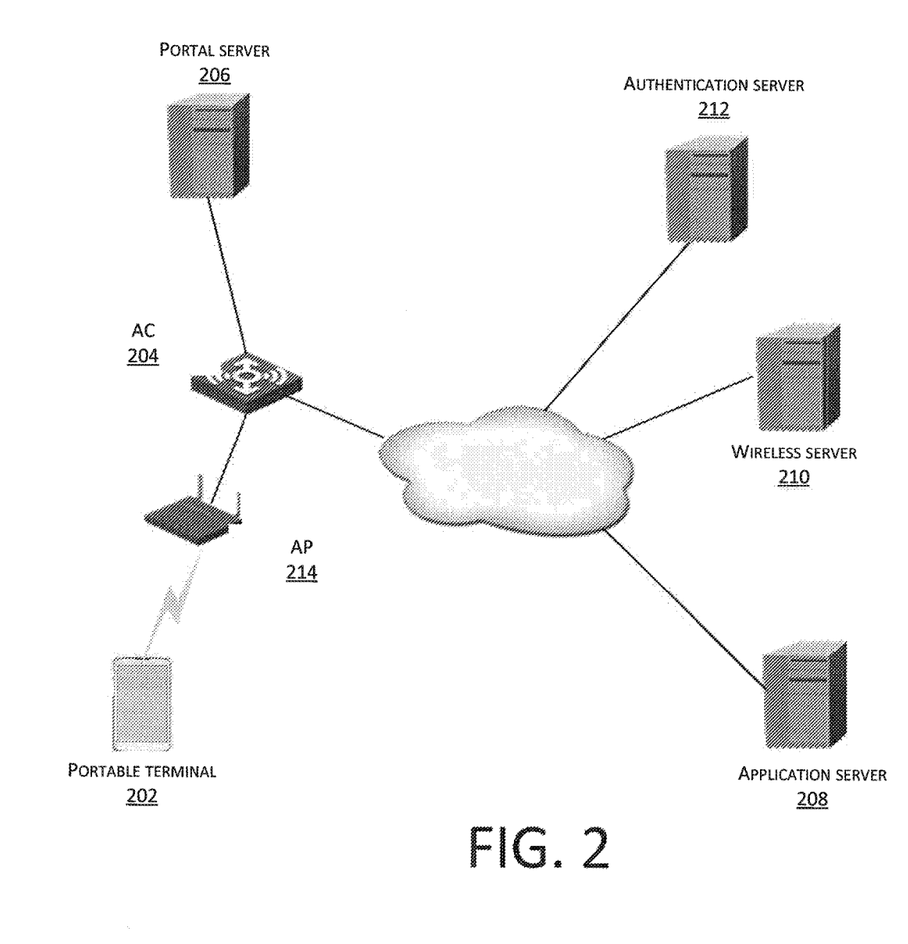
FIG. 2 is a schematic diagram of a typical portal authentication networking.

Prior to the introduction of the example embodiments of the present disclosure, a portal authentication mechanism is described at first so that those of ordinary skill in the art will understand the technical advantages of the present disclosure more clearly. Referring to a networking example shown in FIG. 2, in this networking environment, after a portable terminal 202 such as smart phone successfully connects to a wireless network, a user accesses an external network (such as a site on the Internet) to trigger a portal authentication. The portal authentication process may be briefly described as follows:

Step I: A user uses a browser at a portable terminal 202 to access a website, for example, www.weibo.com. Since an Internet Protocol (IP) address of the site is generally not in an exception list (free of authentication) of an AC (wireless access control server or device) 204 and the IP address of the user is not in the user whitelist of the AC 204, the process turns to Step II.

Step II: A wireless access device redirects the access of the user to a portal server 206 (which is generally integrated with the AC 204) by means of a Hypertext Transfer Protocol (HTTP) redirection, and the portal server returns a portal authentication page to the browser.

Step III: The user enters a user name and password in the portal authentication page and submits an authentication request, and the portal server then submits the authentication request to the wireless access device.

Step IV: The AC 204 initiates a portal authentication to the authentication server 208 to verify if the user name and password entered by the user are matched with an authorized user.

Step V: If the user portal authentication passes, the AC 204 adds the IP address of the user to the user whitelist.

Step VI: The user accesses to any website again, and since the IP address of the user is already in the user whitelist, the access of the user will be allowed.

Step I to Step VI describe a typical portal authentication process, and such process is generally the same as the portal authentication on a PC. To adapt to the requirements of the mobile Internet and bring convenience to users, in a more optimized solution, on the basis of a linkage between a wireless access device (such as the AC 204 described above) and an application server 208, the portal authentication process may be simplified. In Step II, the portal authentication page returned by the portal server 206 carries an application associated component (such as an Alipay™ associated component). After being loaded in the browser, the Alipay™ associated component will perform a calling operation of Alipay™ Wallet that calls Alipay™ Wallet to a foreground of the mobile phone, and sends a notification to ask Alipay™ Wallet to perform a portal authentication on behalf of the user. Assuming that the user has already logged into Alipay™ Wallet at the moment, Alipay™ Wallet performs the portal authentication by using an Alipay™ user name and password of the user according to the notification. In Step IV, since Alipay™ user name and password are used, in this case, an application server 208 (such as Alipay™ server) plays the role of the corresponding authentication server; in this manner, the user does not need to remember the user name and password for the portal authentication, and instead the user can use the Alipay™ user name and password. There may be one or more other wireless server(s) 210 that provides wireless service with the authentication server 212 and the application server 208. The portable terminal 202 may connect to the AC 204 through an AP (access point) 214.

Since the application Alipay™ Wallet may keep a logged-in status regularly, the user generally does not need to open the browser, and the operation of entering the Alipay™ user name and password in the portal authentication process is not necessary. More importantly, as Alipay™ has built partnerships with many merchants, the user may use the same user name and password to implement the portal authentication when paying a visit to those merchants. Of course, if a user is not an Alipay™ user, the user may still perform the portal authentication in a conventional portal authentication mode, but this user may need to register beforehand to acquire a portal user name and password, or acquire a temporary portal user name and password through a text message or in other manners. The authentication of the portal user name and password of such user will still be carried out in the authentication server. This solution facilitates the portal authentication of Alipay™ users or registered users of similar applications. However, such implementation still fails to thoroughly solve the technical problem raised in the background.

Continuing to refer to FIG. 2, the present disclosure further optimizes on the basis of the portal authentication described above. In an example embodiment, the present disclosure is based on an intensive linkage between a network system and an application system. The network system physically includes wireless access devices in a wireless network of a merchant and a wireless server that manages each of the wireless access devices; and the application system physically includes a portable terminal and an application server. The wireless access device provides a wireless network access service for the portable terminal. The wireless access device may be possessed by various merchants such as an operator or a food vendor, which is generally deployed in a physical area where the merchant provides a business service.

Figure 3:
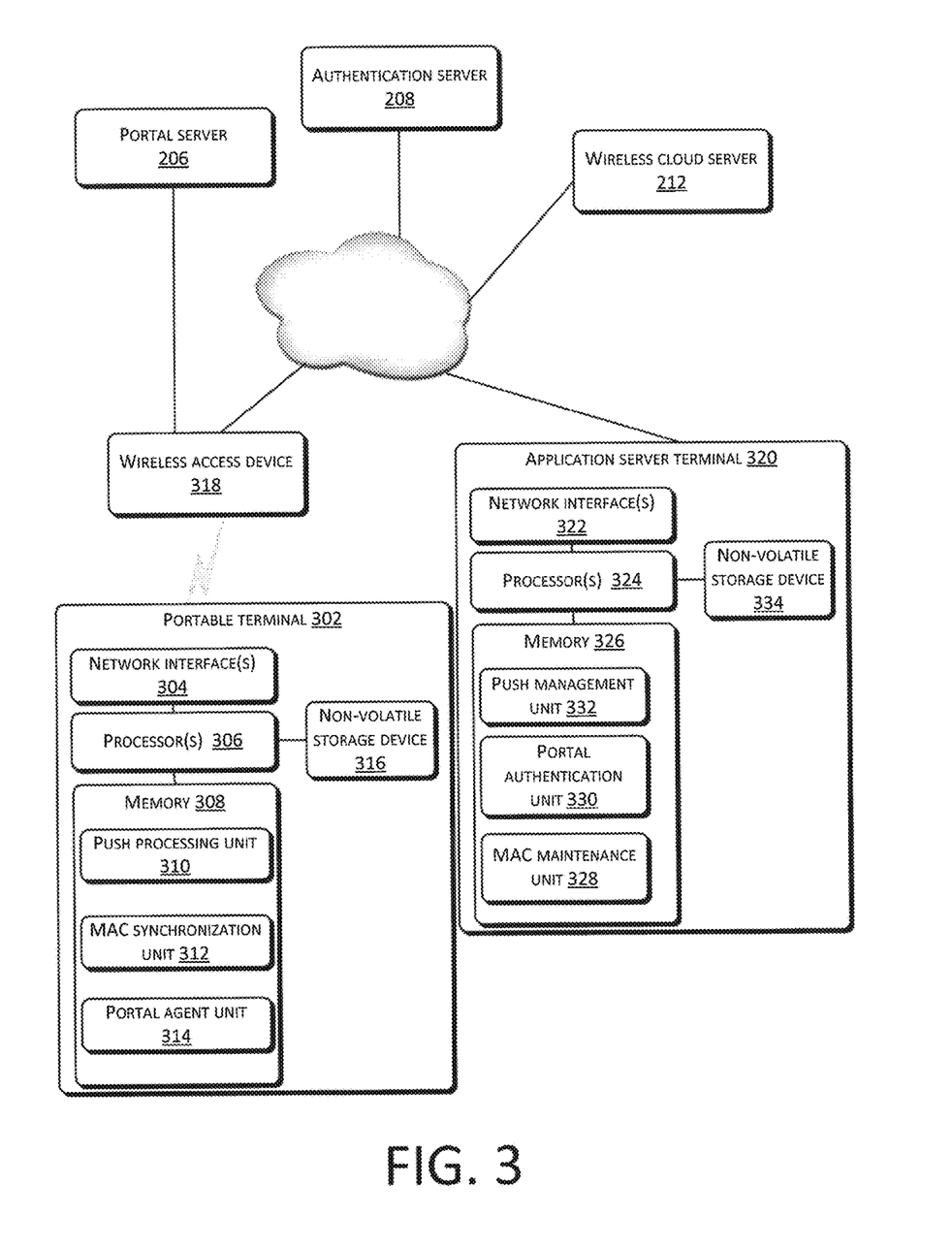
FIG. 3 is a diagram of hardware and logic structure of each node in a linkage system in an example embodiment of the present disclosure.

Referring to FIG. 3, to help depict the present disclosure, hardware architectures of the hosts such as the server and portable terminal are simplified and abstracted. At a hardware layer, each host includes one or more processors, memories, additional non-volatile storage devices, and network interfaces. From the perspective of a service layer, both the application client terminal and the application server terminal in FIG. 3 may be construed as a logic apparatus (also referred to as a "virtual apparatus") formed in the following manner: a processor on a corresponding host reads a computer program or computer-executable instructions into a memory for execution. Of course, the present disclosure does not exclude other implementations, such as a programmable logic device, in addition to software implementation. In other words, an entity executing each processing step in the subsequent description may be implemented by using hardware, a logic device, or the like.

In the example embodiment as shown in FIG. 3, a client or a portable terminal 302 includes one or more network interfaces 304, one or more processors or data processing unit(s) 306, and memory 308. The memory 308 is an example of computer-readable media. The memory 308 may store therein a plurality of modules or units including a push processing unit 310, a MAC synchronization unit 312, and a portal agent unit 314. The portable terminal 302 may further include an additional non-volatile storage device 316. The portable terminal 302 is connected to the network via a wireless access device 318.

An application server terminal 320 includes one or more network interfaces 322, one or more processor(s) or data processing unit(s) 324, and memory 326. The memory 326 is an example of computer-readable media. The memory 326 may store therein a plurality of modules or units including a MAC maintenance unit 328, a portal authentication unit 330, and a push management unit 332. The application server terminal 320 may further include an additional non-volatile storage device 334.

Figure 4:
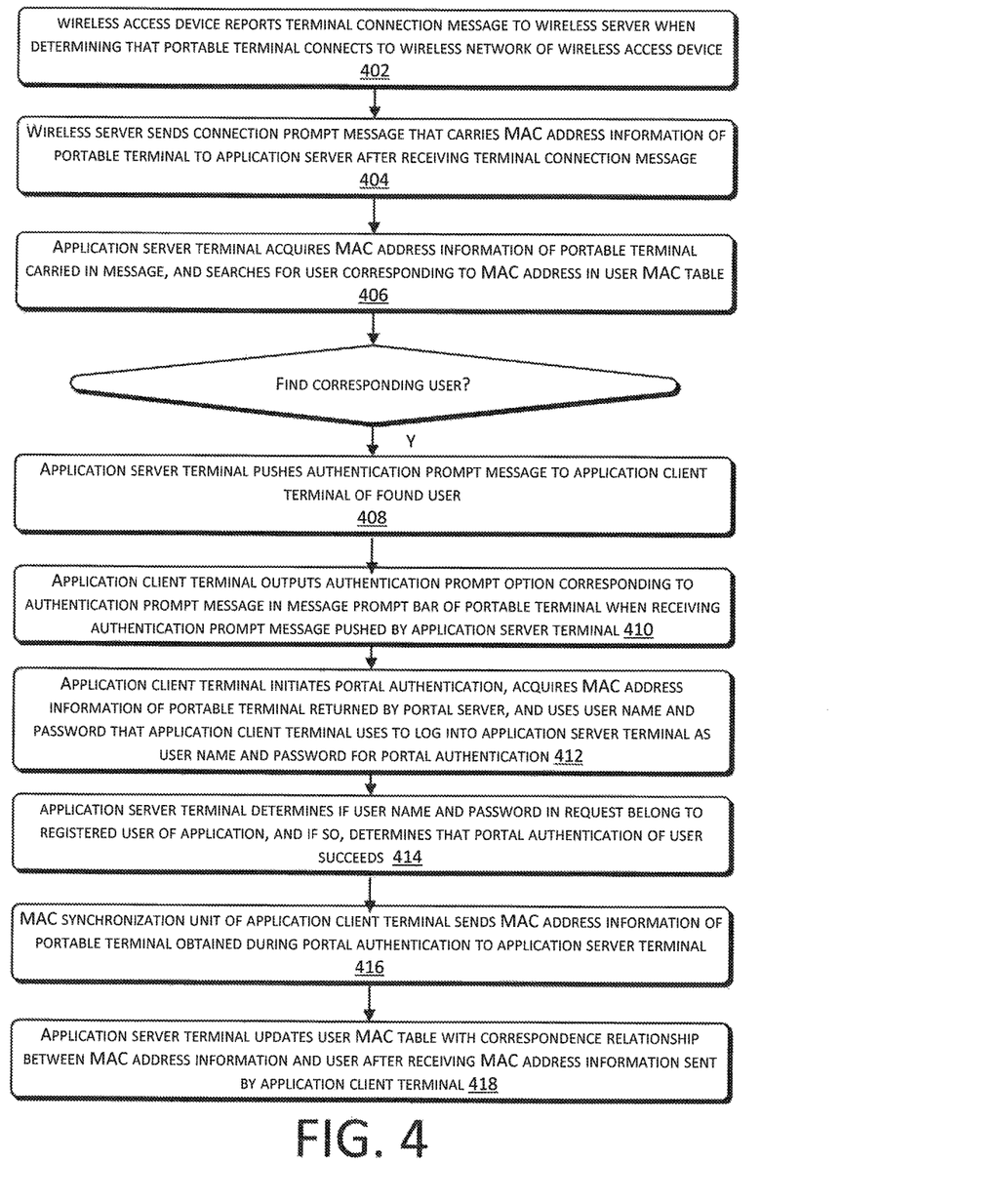
FIG. 4 is a flow chart of an example portal authentication processing according to an example embodiment of the present disclosure.

Referring to FIG. 4, the client terminal, the wireless access device, the wireless server, and the application server terminal coordinate with each other during the operation to perform the following operations.

At 402, the wireless access device reports a terminal connection message to the wireless server when it is determined that a portable terminal connects to the wireless network of the wireless access device. The message carries an identifier of the wireless access device and MAC address information of the portable terminal that connects to the wireless network.

At 404, after the terminal connection message is received, the wireless server sends a connection prompt message to the application server terminal. The connection prompt message carries the MAC address information of the portable terminal.

At 406, when the terminal connection message sent by the wireless server is received, the push management unit of the application server terminal acquires the MAC address information of the portable terminal carried in the message, and searches for a user corresponding to the MAC address in a user MAC table such as a local user MAC table. If the corresponding user is found, operations at 408 are performed. Otherwise, the current process flow is ended.

At 408, the push management unit of the application server terminal pushes an authentication prompt message to an application client terminal of the found user.

At 410, when the authentication prompt message pushed by the application server terminal is received, the push processing unit of the application client terminal outputs an authentication prompt option corresponding to the authentication prompt message in a message prompt bar of the portable terminal.

At 412, after it is determined that the authentication prompt option is selected by the user or after the notification from an associated component of a browser is received, the portal agent unit of the application client terminal initiates the portal authentication, acquires the MAC address information of the portable terminal returned by the portal server after the portal authentication is initiated, and, during the portal authentication, uses a user name and password that the application client terminal uses to log into the application server terminal as a user name and password for the portal authentication.

At 414, when the portal authentication request is received, the portal authentication unit of the application server terminal determines if the user name and password in the request belong to a registered user of the application, and if so, determines that the portal authentication of the user succeeds.

At 416, the MAC synchronization unit of the application client terminal sends the MAC address information of the portable terminal returned by the portal server to the application server terminal.

At 418, after the MAC address information sent by the application client terminal is received, the MAC maintenance unit of the application server terminal updates the user MAC table with a correspondence relationship between the MAC address information and the user.

In the present disclosure, the portable terminal may be a terminal device that is easy for users to carry, for example, a smart phone, a PDA, or a tablet computer. A smart phone is used as an example for the description below. The application client terminal of the present disclosure may be an application software running on the portable terminal, which may be any client terminal from which the user enters a user name and password to log in to the application, such as mobile phone application client terminals including Alipay™ Wallet, Taobao™, Sina™ Weibo™, or Laiwang. The application client terminal Alipay™ Wallet is used as an example for the description below. The application server terminal is service software that runs on an application server and provides a corresponding application service for the application client terminal. The Alipay™ server terminal is used as an example of the application server below. The wireless access device may be a fat AP, a AC in the architecture of AC and thin AP, or other similar network devices having a wireless access function. The AC is used as an example for the description below.

In most cases, one smart phone generally has a unique MAC address, and therefore, one MAC address generally has a relatively stable correspondence relationship with one user using Alipay™ Wallet. When the smart phone connects to a wireless network managed by a certain AC, a corresponding user is thus determined to attempt to access the Internet through the wireless network. In this case, by the linkage mechanism at 404, the Alipay™ server terminal is informed of this event according to the terminal connection message sent by the wireless server. Correspondingly, the Alipay™ server terminal finds a corresponding Alipay™ user according to the MAC address information carried in the message, and in this case, it is assumed that the Alipay™ user is using the afore-mentioned smart phone that connects to the AC. Based on this assumption, the Alipay™ server terminal pushes an authentication prompt message to the Alipay™ client terminal of the user. Alipay™ Wallet generates an authentication prompt option according to the authentication prompt message; as long as the user selects the authentication prompt option, Alipay™ Wallet automatically performs the portal authentication on behalf of the user. During the entire process, the user only needs to select the authentication prompt option by clicking or a similar simple operation, and the portal authentication is completed quickly. Moreover, the present techniques prevent, to a large degree, the problem that users forget to form the portal authentication. The following introduces the advantages of the present disclosure in detail by using a specific implementation.

In the present disclosure, an authentication process for a first-time access of the smart phone to the wireless network is different in certain degrees from an authentication process for a non-first-time access to the wireless network. However, no matter whether it is a first-time access or a non-first-time access, operations from 412 to 418 are performed. In fact, the difference between the portal authentication processes for the first-time access and non-first-time access are just the authentication triggering manner.

1) A process flow when a user connects to a wireless network of a cooperative merchant of Alipay™ for the first time:

It is assumed that a user (Tony) visits a cooperative merchant (assuming it is merchant A) of Alipay™ for the first time. The user uses his smart phone (of which the MAC address is MAC3) to find a wireless network of merchant A, and completes a connection to the wireless network. The user's operation of connecting to the wireless network of merchant A will trigger operations from 402 to 406. At 406, the Alipay™ server terminal searches in a local user MAC table according to MAC3, as shown in Table 1. Since it is the first time that the user uses the Alipay™ server terminal to perform a portal authentication, MAC3 does not exist in Table 1; at the moment, the process flow of the application server terminal is ended here. The application server terminal does not know which user uses a smart phone to connect to the wireless network of merchant A, and therefore, cannot push an authentication prompt message. In other words, when the user connects to the wireless network of the cooperative merchant of Alipay™ for the first time, operations at 408 will not be performed, and the mobile phone of the user will not receive an authentication prompt message. In this case, the user has to trigger a portal authentication process manually.

TABLE 1

| MAC address | User name |
|---|---|
| MAC1 | Tom |
| MAC2 | Jack |
| MAC4 | Zhangsan |
| . . . | . . . |
| MAC131 | Wangwu |
| . . . | . . . |

The process of manually triggering portal authentication by the user is the same as that in the prior art, for example, by accessing to any website that is not in an exception site list, or to put it simply, the portal authentication is triggered as long as the user accesses to the Internet by using the browser. As described above, in this process, the application client terminal Alipay™ Wallet will be called by an Alipay™ associated component running on the browser. Correspondingly, the portal agent unit of Alipay™ Wallet will receive an authentication notification of the associated component.

For example, before the portal authentication is initiated, the portal agent unit may check if the user is in an application logged-in status, and if the user Tony is not in the application logged-in status, an Alipay™ Wallet login interface is called to the foreground so that the user may enter an Alipay™ user name and password in the interface. After the user submits the user name and password, the Alipay™ server terminal performs an identity authentication to complete the application login. Of course, such process is not mandatory, because the portal agent unit may take no account of the security mechanism of the application Alipay™ such that the application Alipay™ has its own login timeout mechanism, but this does not affect the use of the Alipay™ identity information (Alipay™ user name and password) as an alternative in the portal authentication. The portal authentication may be initiated as long as the user name and password of the user are stored in the Alipay™ client terminal. After the portal authentication is initiated, the portal authentication request will finally reach the Alipay™ server terminal, and the portal authentication unit of the Alipay™ server terminal checks if the user name and password in the portal authentication request belong to a registered user of Alipay™, and if so, may return an authentication success notification to the wireless access device. Then the wireless access device notifies the smart phone of the successful authentication. It may be noted here that an IP address that the Alipay™ server terminal uses to provide application services is generally configured in the exception site list of the AC of merchant A; in other words, each user may access the IP address through the AC to acquire application services without any limitation, no matter whether the user passes the authentication or not.

In Step 406, there are two kinds of trigger conditions for initiating the portal authentication: one is that the authentication prompt option is selected by the user, and the other is that a notification from the associated component of the browser is received. When the user connects to the wireless network of the cooperative merchant of Alipay™ for the first time, the trigger condition is the notification of the associated component of the browser. In other words, when the user connects to the wireless network for the first time, operations from 402 to 418 are only partially performed, in which operations at 408 and 410 are not performed and objectives of the operations at 408 and 410 are achieved by a manual operation of the user. In addition to the initiation of the portal authentication at 412, Alipay™ Wallet in the present disclosure further performs operations at 416 and 418, which are different from the prior art.

At 416, the method that the Alipay™ Wallet acquires the MAC address is significantly different from that in the prior art. According to a conventional design idea, application developers normally consider reading the MAC address from the operating system directly, and then sending the MAC address to the server terminal as the MAC address is an attribute of mobile phone hardware. In a conventional PC Internet environment, by using the Windows™ operating system as an example, all ordinary users may acquire the MAC address of the host by using a command such as "ipconfig/all." However, in the mobile Internet environment, such conventional implementation idea has imperceptible technical defects.

First of all, due to concerns over various factors such as information security of users, a mobile operating system provider sets many obstacles for reading a MAC address of a mobile phone. For example, in the Android™ operating system provided by Google™, although applications are allowed to read the MAC address of the smart phone, additional conditions need to be satisfied, and to meet these additional conditions, more complicated development work needs to be done. In the IOS™ operating system provided by Apple™ currently the operating system does not allow mobile phone applications to read the MAC address of the smart phone directly. In order to read the MAC address, such restriction needs to be bypassed, which means there are more complicated development works, and even if the system restriction is bypassed to read the MAC address indirectly, the security of the mobile phone application may be questioned in the IOS™ App store, which is difficult to implement. That is, although it is technically feasible to read the MAC address from the smart phone according to the conventional techniques, the implementation effect is poor.

The present techniques acquire the MAC address of the user in a more convenient method while ensuring the information security of the user. After the smart phone connects to the AC, the AC naturally stores the MAC address of the smart phone as the AC needs to forward packets to the smart phone. Therefore, the AC may pass the MAC address of the smart phone to the portal server during the portal authentication, and the portal server returns the MAC address to the Alipay™ Wallet. In many popular solutions, the portal server is often integrated into the AC, and therefore, it is relatively easy to pass the MAC address. In an example implementation, the present disclosure returns, to the Alipay™ Wallet, the MAC address of the mobile phone as a parameter passed by a redirected uniform resource location (URL) (a passing parameter of the redirected URL). An example of the redirected URL sent by the portal server is shown as follows:

www.portalabc.com/default.asp?id=50-E5-49-BB-3F-BE www.portalabc.com/default.asp represents the URL of the portal authentication page, and www.portalabc.com/default.asp is followed by a variable passing parameter. When the parameter is the MAC address, the parameter has no substantial meaning to the portal authentication process. But by using this process, the present disclosure uses the MAC address of the smart phone of user Tony as the passing parameter of the URL, thereby returning the MAC address to Alipay™ Wallet. In this case, Alipay™ Wallet parses the URL to acquire the MAC address 50-E5-49-BB-3F-BE (MAC3), and then notifies the Alipay™ server terminal of MAC3. In an example embodiment, the Alipay™ server terminal may be notified after the portal authentication succeeds. After MAC3 is received, the Alipay™ server terminal stores a correspondence relationship between the user and the MAC address of the smart phone used by the user accordingly. Table 1 is updated to be Table 2 correspondingly.

TABLE 2

| MAC address | User name |
| --- | --- |
| MAC1 | Tom |
| MAC2 | Jack |
| MAC3 | Tony |

TABLE 2-continued

| MAC address | User name |
|---|---|
| MAC4 | Zhangsan |
| ... | ... |
| MAC131 | Wangwu |
| ... | ... |

Considering that some wireless access devices may encrypt the MAC address into an encrypted character string out of concerns over information security of the user, and return the encrypted character string to the smart phone as the MAC address information, in this case, the Alipay™ Wallet does not need to perform a special processing and a MAC synchronization unit thereon only needs to send the encrypted data to the application server terminal. However, the application server terminal needs to perform the special processing. At 418, the MAC maintenance unit determines if the MAC address information is encrypted data before the MAC address information is stored. If the MAC address information is not the encrypted data, the MAC maintenance unit only needs to store the correspondence relationship between the MAC address information and the user. If the MAC address information is the encrypted data, the MAC maintenance unit needs to invoke, according to a vendor identification additionally carried in the passing parameter, a corresponding decryption algorithm to decrypt the encrypted data, to acquire plaintext MAC address information, and then store the correspondence relationship between the MAC address information and the user. Generally, the provider of the wireless access device has a partnership with Alipay™, and thus the vendor identification of the device and an encryption/decryption corresponding to the identification (if necessary) are stored on the Alipay™ server terminal. By sharing the same encryption/decryption algorithm on both sides, the linkage of the MAC address information is realized, and moreover, the security of user information is improved.

Figure 5:
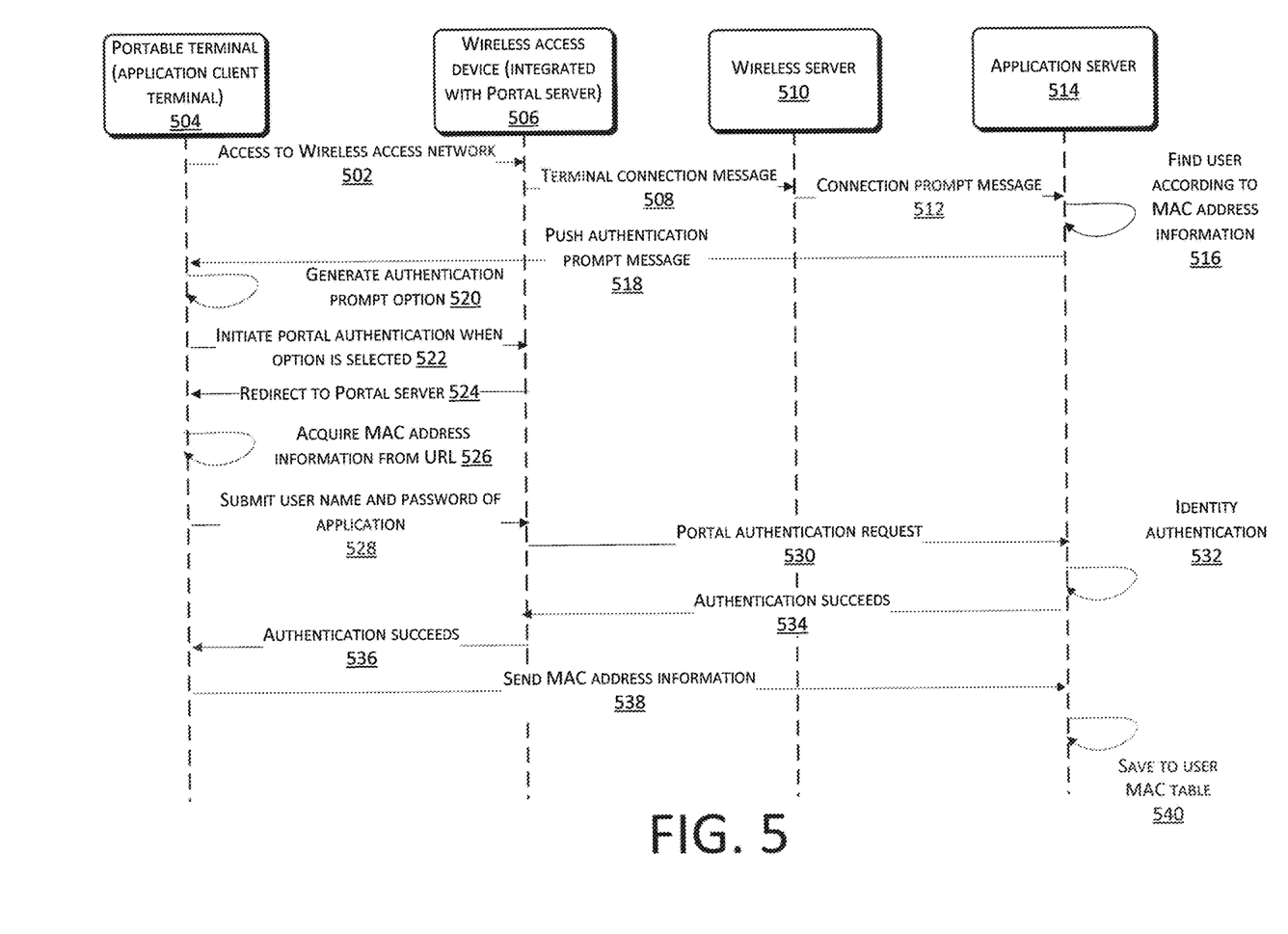
FIG. 5 is a flow chart of an example detailed portal authentication processing according to an example embodiment of the present disclosure.

2) A process flow for the non-first-time access of the user to the wireless network of the cooperative merchant of Alipay™:

Referring to FIG. 5, after the user Tony completes the first portal authentication in cooperative merchant A of Alipay™, the Alipay™ server terminal stores the correspondence relationship between the user and the MAC address of the mobile phone of the user.

In FIG. 5, at 502, a portable terminal (application client terminal) 504 such as smart phone that is installed an application e.g., Alipay™ accesses to a wireless access network via a wires access device 506 (integrated with a portal server). At 508, the wireless access device 506 sends a terminal connection message to a wireless server 510. At 512, the wireless server 510 sends a connection prompt message to an application server 514 such as an Alipay™ server with Alipay™ server terminal. At 516, the application server 514 finds a user according to MAC address information included in the connection prompt message. At 518, the application server 514 pushes an authentication prompt message to the portable terminal 504. At 520, the portable terminal 504 generates an authentication prompt option and displays it to a user. At 522, the portal terminal 504 initiates a portal authentication with the wireless access device 506 when it is determined that the authentication prompt option is selected by the user. At 524 the wireless access device 506 sends the MAC address of the portable terminal 504 returned from the portal server as a passing parameter of a redirected URL to the portable terminal 502. At 526, the portable terminal 504 acquires the MAC address information from the redirected URL. At 528, the portable terminal 504 submits a user name and password of the application such as Alipay™ to the wireless access device 506. At 530, the wireless access device sends a portal authentication request 530 to the application server 514. At 532, the application server 514 conducts an identity authentication 532. At 534, if the identity authentication succeeds, the application server 514 informs the wireless access device. At 536, the wireless access device 506 informs the portable terminal 504 that the authentication succeeds. At 538, the portable terminal 504 sends its MAC address information to the application server 514. At 540, the application server 514 saves the MAC address information and the user to a user MAC table.

With the correspondence relationship and the operations from 402 to 418, it is quite convenient for the user Tony to subsequently use a wireless network in any cooperative merchant of Alipay™. Assuming that the user Toney visits merchant B again several days later, the user Tony uses his smart phone to find the wireless network of merchant B, and completes a connection to the wireless network. As described above, the user's operation of connecting to the wireless network of merchant B triggers operations from 402 to 406. The Alipay™ server terminal finds that the user using MAC3 is Tony when searching in the local user MAC table (which is Table 2 in this case), and then the application server terminal turns to 408 to push an authentication prompt message to the user.

As described above, the Alipay™ server terminal is in the exception site list of the AC; therefore, the mutual access between Alipay™ Wallet and the Alipay™ server terminal is unlimited, while the application Alipay™ Wallet generally keeps a connection with the Alipay™ server terminal in the background to timely transmit important data with each other. Therefore, the authentication prompt message may be pushed to Alipay™ Wallet of user Tony smoothly. After the message is received, Alipay™ Wallet performs operations at 410 correspondingly to output an authentication prompt option in the message prompt bar (for example, at the top of the screen of the mobile phone). The design of message prompt option of social applications such as Weibo™ or other similar designs (which will not be specifically described) may be used to output the option, which is not detailed herein.

In order to achieve a better prompt effect, Alipay™ Wallet may also output sound or a vibration prompt to remind the user correspondingly. After the user finds the authentication prompt option in the message prompt bar of the mobile phone, the user may select the authentication prompt option by performing pull-down and clicking operations. Once the authentication prompt option is selected, Alipay™ Wallet performs operations at 412 to complete the portal authentication on behalf of the user. After the authentication succeeds, the IP address of the user will be added to the whitelist of the AC; in this way, the user may pass the portal authentication almost without perceiving it, and access the Internet.

As shown, for any Alipay™ user, during the first-time connection to the wireless network of the cooperative merchant of Alipay™, the user needs to manually open the browser and enter a website to trigger a portal authentication process. Afterwards, when the user goes to any cooperative merchant of Alipay™ and successfully connects to the wireless network, the user will receive an authentication prompt in a very short time, and only needs to select the authentication prompt option by performing operations such as pull-down and clicking to complete the portal authentication easily. On one hand, the user does not need to perform relatively complex operations such as opening the browser to enter a website. On the other hand, since the user acquires the authentication prompt, it prevents the user from forgetting to perform the portal authentication, which is more meaningful for those who are not familiar with the portal authentication technology.

In the foregoing implementation, the description focuses on the case in which the user uses a particular smart phone, which may generally satisfy the use demands of the majority of users. The present disclosure is also applicable to the case in which the user uses multiple portable terminals. It is assumed that the user Tony uses two smart phones, in which the MAC address of mobile phone 1 is MAC3 and the MAC address of mobile phone 2 is MAC256. If the user Tony uses the mobile phone 2 to repeat the foregoing use process, the server terminal only needs to store one unique table entry for one user; that is, the table entry of Tony is updated, and the MAC address of Tony is updated to be MAC256. If Tony uses the mobile phone 1 again, the table entry of Tony is refreshed again. In addition, if Tony no longer uses the Alipay™ Wallet, it means that the table entry where MAC3 is located has not been updated in a long time. Thus, this table entry may be deleted according to a preset aging mechanism. In other words, if the third table entry in Table 3 is never updated at 418 or is not updated for more than a preset threshold of item, it may be inferred that the user no longer uses the MAC address, and thus this table entry may be deleted. If Tony uses this MAC address (for example, uses the original mobile phone) again, the present disclosure may still perform a normal processing according to the procedures described above.

TABLE 3

| MAC address | User name |
| --- | --- |
| MAC1 | Tom |
| MAC2 | Jack |
| ... | ... |
| MAC131 | Wangwu |
| MAC256 | Tony |
| ... | ... |

Figure 6:
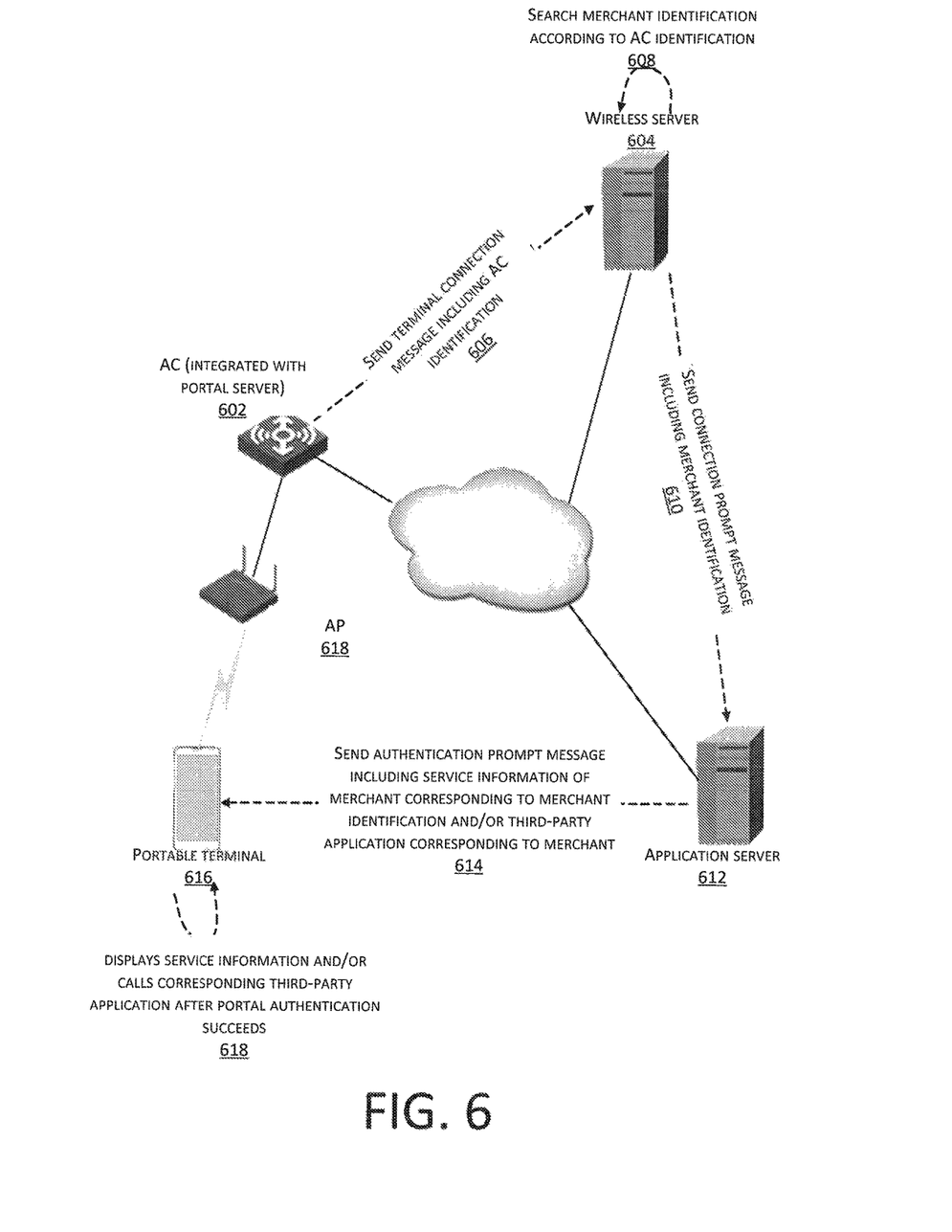
FIG. 6 is a schematic diagram of an example convenient linkage process for a merchant and a user according to an example embodiment of the present disclosure.

On the basis of the foregoing implementation, the linkage mechanism of the present disclosure can facilitate the linkage between users and merchants. Referring to FIG. 6, it is assumed that an AC 602 (whose device identifier is AC 100) in FIG. 6 has a correspondence relationship with a merchant whose merchant identifier is HDL. The AC 602 may be a device bought or rented by merchant HDL. That is, the AC and the merchant have a correspondence relationship on the side of the wireless server, and this correspondence is often stored in a database of the wireless server 604, as shown in Table 4.

TABLE 4

| Device identifier | Merchant identifier |
| --- | --- |
| AC1 | XBK |
| AC2 | XBK |
| ... | ... |
| AC100 | HDL |
| AC101 | HDL |
| ... | ... |

At 606, the AC 602 sends a terminal connection message including the AC identification to the wireless server 604. At 608, the wireless server 604 searches the merchant identification according to the AC identification. At 610, the wireless server 604 sends a connection prompt message including the merchant identification to an application server 612 such as an Alipay™ server terminal. At 614, the application server 612 sends an authentication prompt message that includes service information of the merchant corresponding to the merchant identification and/or a third-party application corresponding to the merchant to a portable terminal 616 such as a smart phone installed an Alipay™ client terminal. At 618, the portable terminal 616 displays the server information and/or call the corresponding third-party application after the portal authentication succeeds. At 618, the portable terminal 616 displays the service information and/or calls the corresponding third-party application after the portal authentication succeeds. The portable terminal 616 connects with the AC 602 via an AP 618.

The wireless server finds the corresponding merchant identifier HDL according to the AC identifier, namely, AC100, carried in the terminal connection message, adds the merchant identifier HDL to the connection prompt message, and sends it to the Alipay™ server terminal. The Alipay™ server terminal stores the service information and/or a third-party application identifier corresponding to merchant HDL. In terms of implementation, the Alipay™ server terminal may further include a merchant interface unit. The merchant interface unit may be a web service window. After the merchant logs in by using a corresponding enterprise account, the service information and third-party application identifier configured by the merchant are sent to the merchant interface unit, and the merchant interface unit stores the service information and third-party application identifier in a merchant information table. The merchant HDL may use the merchant interface unit to update the service information, such as commodity promotion information and new arrival information, in the merchant information table on the application server terminal regularly or irregularly. The third-party application identifier may be an identifier of an application client terminal corresponding to the merchant HDL, such as an ordering client developed by HDL itself, or an application client terminal, such as Taobao™ app, developed by a cooperator of HDL and applicable to HDL.

The push management unit of the Alipay™ server terminal searches the merchant information table (referring to the example in FIG. 5) according to the merchant identifier HDL in the connection prompt message to determine the corresponding service information and/or third-party application identifier. The push management unit adds the found service information and/or third-party application identifier to the authentication prompt message, and pushes the authentication prompt message to Alipay™ Wallet. After Alipay™ Wallet receives the authentication prompt message, the push processing unit of Alipay™ Wallet acquires the service information from the authentication prompt message and displays the service information. In an example embodiment, the push processing unit may display the service information after the portal authentication is passed as the service information may include a link and the user needs to click the link to access a corresponding site. Before the portal authentication is passed, the user cannot access those sites unless they are in the whitelist of exception sites.

If the authentication prompt message further carries a third-party application identifier, the push processing unit may further check if the smart phone has a corresponding third-party application locally. If the smart phone has the corresponding third-party application locally, the push processing unit starts the third-party application. If the smart phone does not have the corresponding third-party application locally, the push processing unit gives up, or suggests that the user download the third-party application. Referring to Table 5 below, during the process that the user connects to the wireless network of the merchant HDL, in addition to assisting the user to complete the authentication promptly, the present techniques further display the latest service information of merchant HDL to the user so that the user may conveniently have updated latest merchant service information in time. In addition, assuming that HDL is a food vendor and develops an ordering client terminal "HDL ordering," by invoking the application client terminal after the authentication succeeds, the push management unit facilitates self-service ordering of the user who is planning to dine in HDL. There is no doubt that display of such service information and calling of the third-party application make consumption activities of users in merchant HDL much easier and reduce the costs of communication between consumers and the merchant.

TABLE 5

| Merchant identifier | Service information | Third-party application identifier |
|---|---|---|
| XBK | 50% off at weekends | |
| KDJ | Buy one X and get one X free | KDJ takeout |
| . . . | . . . | . . . |
| HDL | 90 coupon for consumption above 300. For details, visit www.hdlxxx.com | HDL ordering |
| . . . | . . . | . . . |

In a standard configuration, a computing device, such as any server or device as described in the present disclosure may include one or more central processing units (CPU), one or more input/output interfaces, one or more network interfaces, and memory.

The memory may include forms such as non-permanent memory, random access memory (RAM), and/or non-volatile memory such as read only memory (ROM) and flash random access memory (flash RAM) in the computer-readable media. The memory is an example of computer-readable media.

The computer-readable media includes permanent and non-permanent, movable and non-movable media that may use any methods or techniques to implement information storage. The information may be computer-readable instructions, data structure, software modules, or any data. The example of computer storage media may include, but is not limited to, phase-change memory (PCM), static random access memory (SRAM), dynamic random access memory (DRAM), other type RAM, ROM, electrically erasable programmable read only memory (EEPROM), flash memory, internal memory, CD-ROM, DVD, optical memory, magnetic tape, magnetic disk, any other magnetic storage device, or any other non-communication media that may store information accessible by the computing device. As defined herein, the computer-readable media does not include transitory media such as a modulated data signal and a carrier wave.

It should be noted that the term "including," "comprising," or any variation thereof refers to non-exclusive inclusion so that a process, method, product, or device that includes a plurality of elements does not only include the plurality of elements but also any other element that is not expressly listed, or any element that is essential or inherent for such process, method, product, or device. Without more restriction, the elements defined by the phrase "including a . . . " does not exclude that the process, method, product, or device includes another same element in addition to the elements.

One of ordinary skill in the art would understand that the example embodiments may be presented in the form of a method, a system, or a computer software product. Thus, the present techniques may be implemented by hardware, computer software, or a combination thereof. In addition, the present techniques may be implemented as the computer software product that is in the form of one or more computer storage media (including, but is not limited to, disk, CD-ROM, or optical storage device) that include computer-executable or computer-readable instructions.

The above description describes the example embodiments of the present disclosure, which should not be used to limit the present disclosure. One of ordinary skill in the art may make any revisions or variations to the present techniques. Any change, equivalent replacement, or improvement without departing the spirit and scope of the present techniques shall still fall under the scope of the claims of the present disclosure.

What is claimed is:

1. An application client terminal comprising:
one or more processors;
one or more memories stored thereon computer-readable instruction, that when executed by the one or more processors, causes the one or more processors to perform actions comprising:
sending a request to a server, the request including a media access control (MAC) address of the application terminal, the MAC address being unreadable by an application running on the application client terminal prior to a connection between the application and the server;
establishing the connection between the application and the server;
receiving the MAC address of the application client terminal by the application from the server;
associating the MAC address with an account with an application server terminal; and
using log-in information that the application client terminal logs into the account with the application server terminal for a portal authentication.

2. The application client terminal of claim 1, wherein the receiving the MAC address of the application client terminal from the server includes obtaining MAC address information by acquiring the MAC address information from a redirected uniform resource locator (URL) returned by the server, the MAC address information being a parameter passed by the redirected URL.

3. The application client terminal of claim 1, wherein the portal authentication is sent by an application associated component of a browser.

4. The application client terminal of claim 1, wherein the actions further comprise:
determining whether the application client terminal is logged into by a user prior to starting the portal authentication; and
initiating the portal authentication in response to determining that the application client terminal is logged in; or presenting a log-in interface to request the user to log into the application client terminal in response to determining that the application client terminal is not logged in.

5. The application client terminal of claim 1, wherein the actions further comprise:
outputting an authentication prompt option corresponding to an authentication prompt message in a message prompt bar of the application client terminal.

6. The application client terminal of claim 5, wherein:
the authentication prompt message includes a third-party application identifier; and
the actions further comprise starting a corresponding third-party application according to the third-party application identifier after the portal authentication succeeds.

7. The application client terminal of claim 6, wherein the corresponding third-party application corresponds to a merchant associated with a wireless network to which the application client terminal connects.

8. The application client terminal of claim 5, wherein:
the authentication prompt message includes service information corresponding to a merchant; and
the actions further comprise displaying the service information after the portal authentication succeeds.

9. The application client terminal of claim 5, wherein the actions further comprise initiating the portal authentication after determining that the authentication prompt option is selected by a user.

10. The application client terminal of claim 1, wherein the actions further comprise sending the MAC address to the application server terminal.

11. A method comprising:
obtaining a media access control (MAC) address of an application client terminal by an application running on the application client terminal from a server, the MAC address being inaccessible by the application from the application client terminal.

12. The method of claim 11, wherein the obtaining the MAC address includes acquiring MAC address information from a redirected uniform resource locator (URL) returned by the server, the MAC address information being a parameter passed by the redirected URL.

13. The method of claim 11, further comprising:
associating the MAC address with an account with an application server terminal; and
using log-in information that the application client terminal logs into the account with the application server terminal for a portal authentication,
wherein the portal authentication is sent by an application associated component of a browser.

14. The method of claim 13, further comprising:
checking whether the application client terminal is logged into by a user prior to starting the portal authentication; and
initiating the portal authentication in response to determining that the application client terminal is logged in; or
presenting a log-in interface to request the user to log into the application client terminal in response to determining that the application client terminal is not logged in.

15. The method of claim 14, further comprising:
outputting an authentication prompt option corresponding to an authentication prompt message in a message prompt bar of the portable terminal when receiving the authentication prompt message pushed by the application server terminal, the authentication prompt message including a third-party application identifier, the third-party application corresponding to a merchant associated with a wireless network to which the application client terminal connects; and
starting a corresponding third-party application according to the third-party application identifier after the portal authentication succeeds.

16. The method of claim 13, further comprising:
receiving an authentication prompt message includes service information corresponding to a merchant; and
displaying the service information after the portal authentication succeeds.

17. A method comprising:
acquiring media access control (MAC) address information of a terminal carried in a terminal connection message from the terminal; and
returning the MAC address information to the terminal as a parameter of a redirected uniform resource locator (URL).

18. The method of claim 17, further comprising:
searching for a user account of an application corresponding to the MAC address information in a user MAC table;
pushing an authentication prompt message to the terminal requesting log-in information for the application after the user account is found;
determining that a portal authentication succeeds in response to determining that log-in information provided through the portable terminal for the application belongs to the user account; and
updating the user MAC table with a correspondence relationship between the MAC address information and the registered user.

19. The method of claim 17, wherein:
the terminal connection message includes a merchant identifier corresponding to a wireless access device to which the portable connects.

20. The method of claim 19, further comprising:
searching for corresponding service information in a local merchant information table according to the merchant identifier, and
sending the service information in the authentication prompt message to the user.

* * * * *